US012775494B2

(12) United States Patent
Iorgulescu et al.

(10) Patent No.: US 12,775,494 B2
(45) Date of Patent: Oct. 27, 2026

(54) MEMORY-TRACKING RESOURCE MANAGER FOR ELASTIC DISTRIBUTED GRAPH-PROCESSING SYSTEM

(71) Applicant: Oracle International Corporation, Redwood Shores, CA (US)

(72) Inventors: Calin Iorgulescu, Zurich (CH); Martin Kučera, Redwood City, CA (US); Vasileios Trigonakis, Zurich (CH); Arnaud Delamare, Zurich (CH); Petr Koupy, Zurich (CH); Jinsu Lee, Belmont, CA (US); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 388 days.

(21) Appl. No.: 18/369,254

(22) Filed: Sep. 18, 2023

(65) Prior Publication Data

US 2025/0094224 A1 Mar. 20, 2025

(51) Int. Cl.
*G06F 9/50* (2006.01)
*G06F 9/48* (2006.01)

(52) U.S. Cl.
CPC ............ *G06F 9/5016* (2013.01); *G06F 9/485* (2013.01)

(58) Field of Classification Search
None
See application file for complete search history.

(56) References Cited

U.S. PATENT DOCUMENTS

| | | | | |
|---|---|---|---|---|
| 6,047,356 | A * | 4/2000 | Anderson | G06F 12/0866 709/215 |
| 7,861,246 | B2 * | 12/2010 | Lu | G06F 9/5072 709/201 |
| 8,234,233 | B2 | 7/2012 | Zhou | |
| 8,543,517 | B2 | 9/2013 | Shotton | |
| 8,640,137 | B1 * | 1/2014 | Bostic | G06F 9/5072 718/104 |

(Continued)

OTHER PUBLICATIONS

Trigonakis, U.S. Appl. No. 16/778,668, filed Jan. 31, 2020, Notice of Allowance and Fees Due, Mar. 13, 2023.

(Continued)

*Primary Examiner* — Mustafa A Amin
(74) *Attorney, Agent, or Firm* — Hickman Becker; Bingham Ledesma LLP; Stephen R. Tkacs

(57) ABSTRACT

A resource manager tracks the amount of available memory for a cluster of machines and for each machine in the cluster. The resource manager receives a reservation request from a job for a graph processing operation. The reservation request specifies an identification of the job, a type of reservation, and an amount of memory requested. The resource manager determines whether to grant the reservation request based on the type of reservation, the amount of memory requested, and the amount of available memory in the cluster or in one or more machines in the cluster. In response to determining to grant the reservation request, the resource manager sends a response to the job indicating an amount of memory reserved and adjusts the amount of available cluster memory and the amount of available machine memory for at least one machine in the cluster based on the amount of memory reserved.

34 Claims, 7 Drawing Sheets

(56) References Cited

U.S. PATENT DOCUMENTS

| | | | | |
|---|---|---|---|---|
| 9,135,565 | B1 | 9/2015 | Khalefa | |
| 9,781,057 | B1 * | 10/2017 | Foley | G06F 9/524 |
| 10,152,449 | B1 * | 12/2018 | Ward, Jr. | G06F 15/173 |
| 11,467,872 | B1 * | 10/2022 | Mauer | G06F 9/5044 |
| 2005/0015511 | A1 | 1/2005 | Izmailov | |
| 2006/0206882 | A1 | 9/2006 | Illowsky | |
| 2007/0106669 | A1 * | 5/2007 | Krishnamoorthy | G06Q 10/06 |
| 2007/0220152 | A1 * | 9/2007 | Jackson | G06Q 40/00 705/35 |
| 2007/0255835 | A1 * | 11/2007 | Coppinger | G06F 9/505 709/229 |
| 2007/0256078 | A1 * | 11/2007 | Falk | G06F 9/505 718/104 |
| 2012/0109889 | A1 | 5/2012 | Wu | |
| 2013/0019015 | A1 * | 1/2013 | Devarakonda | G06F 9/5072 709/226 |
| 2015/0229546 | A1 | 8/2015 | Somaiya | |
| 2015/0261817 | A1 | 9/2015 | Harris | |
| 2015/0378789 | A1 * | 12/2015 | Jackson | G06F 9/5061 718/104 |
| 2016/0078361 | A1 | 3/2016 | Brueckner | |
| 2016/0306896 | A1 | 10/2016 | Paradies | |
| 2017/0091246 | A1 | 3/2017 | Risvik | |
| 2017/0118042 | A1 | 4/2017 | Bhattacharya | |
| 2017/0255674 | A1 | 9/2017 | Attaluri | |
| 2018/0084081 | A1 * | 3/2018 | Kuchibhotla | H04L 67/51 |
| 2018/0210764 | A1 * | 7/2018 | Greeff | G06F 9/46 |
| 2018/0329958 | A1 | 11/2018 | Choudhury | |
| 2020/0042836 | A1 | 2/2020 | Okada | |
| 2020/0117762 | A1 | 4/2020 | Haprian | |
| 2020/0403930 | A1 * | 12/2020 | Das | H04L 47/72 |
| 2021/0089580 | A1 | 3/2021 | Deng | |
| 2021/0240705 | A1 | 8/2021 | Trigonakis | |
| 2021/0334141 | A1 * | 10/2021 | Ou | G06F 13/18 |
| 2021/0406717 | A1 | 12/2021 | Tauheed | |
| 2022/0206861 | A1 * | 6/2022 | Jackson | G06F 9/5027 |
| 2022/0391257 | A1 * | 12/2022 | Schmidt | G06F 9/5038 |
| 2023/0108964 | A1 | 4/2023 | Isen | |
| 2023/0134683 | A1 | 5/2023 | Carranza | |
| 2023/0280738 | A1 | 9/2023 | Villero | |
| 2024/0241759 | A1 * | 7/2024 | Gamage | G06F 9/4881 |

OTHER PUBLICATIONS

Trigonakis, U.S. Appl. No. 16/778,668, filed Jan. 31, 2020, Notice of Allowance and Fees Due, Feb. 2, 2023.

Trigonakis, U.S. Appl. No. 16/778,668, filed Jan. 31, 2020, Non-Final Rejection, Oct. 1, 2021.

Trigonakis, U.S. Appl. No. 16/778,668, filed Jan. 31, 2020, Non-Final Rejection, Aug. 24, 2022.

Trigonakis, U.S. Appl. No. 16/778,668, filed Jan. 31, 2020, Advisory Action, Jun. 30, 2022.

Trigonakis, U.S. Appl. No. 16/778,668, filed Jan. 31, 2020, Final Rejection, Apr. 8, 2022.

Schweizer, U.S. Appl. No. 18/384,248, filed Oct. 26, 2023, Notice of Allowance and Fees Due, Jun. 26, 2025.

Dekel et al., "Cachesensitive Optimization of Immutable Graph Taversals (CS745 Project Report)", ACM, dated 2015, 9 pages.

Abdelaziz et al.,"Combining Vertex-Centric Graph Processing with SPARQL for Large-Scale RDF Data Analytics", IEEE Transactions on Parallel and Distributed Systems, http://dx.doi.org/10.1109/TPDS.2017.2720174, dated 2017, 15 pages.

Labouseur et al., "The G* Graph Database: Efficiently Managing Large Distributed Dynamic Graphs", Springer Science+Business Media, Distrib Parallel Databases, DOI: 10.1007/s10619-014-7140-3, dated Mar. 2014, 36 pages.

Kim et al., "TurboFlux: A Fast Continuous Subgraph Matching System for Streaming Graph Data", SIGMOD 2018, DOI: https://doi.org/10.1145/3183713.3196917, dated Jun. 2018, 16 pages.

Khandelwal et al., "ZipG: A Memory-Efficient Graph Store for Interactive Queries", SIGMOD 2017, DOI: http://dx.doi.org/10.1145/3035918.3064012, dated May 2017, 16 pages.

Kankanamge et al., "Graphflow: An Active Graph Database", SIGMOD 2017, DOI: http://dx.doi.org/10.1145/3035918.3056445, dated May 2017, 4 pages.

Iyer et al., "ASAP: Fast, Approximate Graph Pattern Mining at Scale", Proceedings of the 13th USENIX Symposium on Operating Systems Design and Implementation, https://www.usenix.org/conference/osdi18/presentation/iyer, dated Oct. 2018, 18 pages.

Lumsdaine et al., "Challenges in Parallel Graph Processing", World Scientific Publishing Company, Parallel Processing Letters, dated Jan. 2007, 16 pages.

Dubey et al., "Weaver: A High-Performance, Transactional Graph Database Based on Refinable Timestamps", Proceedings of the VLDB Endowmwnt, vol. 9, No. 11, https://arxiv.org/pdf/1509.08443.pdf, dated 2016, 12 pages.

Lyu et al., "DBL: Reachability Queries on Dynamic Graphs", Technical Report, dated Jan. 4, 2019, 27 pages.

David et al., "Asynchronized Concurrency: The Secret to Scaling Concurrent Search Data Structures", ASPLOS 2015, http://dx.doi.org/10.1145/2694344.2694359, dated Mar. 2015, 14 pages.

Dave et al., GraphFrames: An Integrated API for Mixing Graph and Relational Queries, Grades 2016, DOI: http://dx.doi.org/10.1145/2960414.2960416, dated Jun. 2016, 8 pages.

Cong et al., "Solving Large, Irregular Graph Problems using Adaptive Work-stealing", dated 2008, 10 pages.

Chen et al., "G-Minor: An Efficient Task-Oriented Graph Mining System?", EuroSys 2018, Association for Computing Machinery, https://doi.org/10.1145/3190508.3190545, dated Apr. 2018, 12 pages.

Buleon, "OrientDB—The Multi-Model and Graph Database", Info-H-415: Advanced Databases, http://orientdb.com/docs/last/index.html, dated 2017, 20 pages.

Boncz et al., Breaking the Memory Wall in MonetDB, Communications of the ACM, vol. 15, No. 12, dated Dec. 2008, 9 pages.

Azure Cosmos DB, "Fast NoSQL Database with Open APIs for any Scale", https://azure.microsoft.com/en-gb/services/cosmos-db, dated 2018, 20 pages.

Hong et al., "PGX.D: A Fast Distributed Graph Processing Engine", High Performance Computing, Networking and Storage Conference, SC 2015, DOI: http://dx.org/10.1145/2807591.2807620, dated Nov. 2015, 12 pages.

Shao et al., "Trinity Graph Engine and its Applications", Bulletin of the IEEE Computer Society Technical Committee on Data Engineering, https://www.graphengine.io/downloads/papers/TrinityAndApps.pdf, dated 2017, 12 pages.

Zaharia et al., "Resilient Distributed Datasets: A Fault-Tolerant Abstraction for In-Memory Cluster Computing", 9th USENIX Symposium on Networked Systems Design and Implementation, dated Apr. 2012, 14 pages.

Yan et al., "A General-Purpose Query-Centric Framework for Querying Big Graphs", Proceedings of the VLDB Endowment, vol. 9, No. 7, https://dl.acm.org/doi/abs/10.14778/2904483.2904488, dated 2016, 12 pages.

Virtuoso Universal Server, "Data-Driven Agility without Compromise", http://virtuoso.openlinksw.com, dated 2019, 10 pages.

Titan.thinkaurelius.com, Chapter 3: Getting Started, s3.thinkaurelius.com/docs/titan/1.0.0/getting-started.html, dated 2015, 8 pages.

The Linux Foundation, "JanusGraph", https://docs.janusgraph.org, dated 2020, 3 pages.

Spyropoulos et al., "Digree: Building A Distributed Graph Processing Engine out of Single-Node Graph Database Installations", SIGMOD Record—vol. 46, No. 4, https://dl.acm.org/doi/abs/10.1145/3186549.3186555, dated 2017, 6 pages.

Priya et al., "A Survey on Realizing Memory-Optimized Distributed Graph Processing", IOSR Journal of Engineering, Aug. 2018, 7 pages.

Shao et al., "Trinity: A Distributed Graph Engine on a Memory Cloud", SIGMOD 2013, https://dl.acm.org/doi/abs/10.1145/2463676.2467799, dated Jun. 2013, 12 pages.

Zhang et al., "REGTT: Accelerating Tree Traversals on GPUs by Exploiting Regularities", dated 2016, 10 pages.

Sarwat et al., "Horton+: A Distributed System for Processing Declarative Reachability Queries over Partitioned Graphs", Proceedings of the VLDB Endowment, vol. 6, No. 14, https://dl.acm.org/doi/abs/10.14778/2556549.2556573, dated Aug. 2013, 12 pages.

(56) References Cited

OTHER PUBLICATIONS

Page et al., "The PageRank Citation Ranking: Bringing Order to the Web", http://ilpubs.stanford.edu:8090/422/1/1999-66.pdf, dated Jan. 1998, 17 pages.
Openquery.com, "OQGraph Engine for MariaDB", https://openquery.com.au/products/graph-engine, dated Apr. 2008, 4 pages.
Ongaro, Diego et al., "In Search of an Understandable Consensus Algorithm", Jun. 2014, 16 pages.
Müller, "Engineering Aggregation Operators for Relational In-Memory Database Systems", Karlsruhe Institute of Technology, Germany, dated 2016, 197 pages.
Microsoft Graph Engine, "Graph Engine: Serving Big Graphs in Real-Time", https://www.graphengine.io, dated 2017, 2 pages.
Ma et al., "G-SQL: Fast Query Processing via Graph Exploration", Proceedings of the VLDB Endowment, vol. 9, No. 12, DOI: 2150-8097/16/08, dated 2016, 12 pages.
Sharma, "Dragon: A Distributed Graph Query Engine", Facebook Engineering, https://code.fb.com/datainfrastructure/dragon-a-distributed-graph-query-engine, dated Mar. 2016, 7 pages.

* cited by examiner

*FIG. 1*

Pattern Matching

| Machine 0 | Machine 1 |
|---|---|
| person0 | person101 |
| person0 | person101 |
| person0 | person101 |
| person1 | |
| person2 | |
| person2 | |
| person3 | |
| person4 | |
| person4 | |

GROUP BY

| Machine 0 | Machine 1 |
|---|---|
| person0, 3 | person101, 3 |
| person2, 2 | person1, 1 |
| person4, 2 | person3, 1 |

ORDER BY

| Machine 0 | Machine 1 |
|---|---|
| person0, 3 | person1, 1 |
| person101, 3 | person3, 1 |
| person2, 2 | |
| person4, 2 | |

FIG. 5

| Restart # | Total Memory Reserved w/o factor | Total Memory Reserved with 2x factor |
|---|---|---|
| 1 | 1 GB | 2 GB |
| 2 | 2 GB | 4 GB |
| 3 | 3 GB | 8 GB |
| 4 | 4 GB | 16 GB |
| 5 | 5 GB | 32 GB |
| 6 | 6 GB | 64 GB |
| 7 | 7 GB | - |
| 8 | 8 GB | - |
| ... | ... | - |
| 50 | 50 GB | - |

FIG 6

| Timestamp | Status | Explanation |
|---|---|---|
| 1 | • Available memory: 100GB<br>• On-hold jobs: A: 250GB<br>• New jobs: C: 90GB<br>• Expected extra memory: 2 * 100GB | • 2x 100GB will soon be added due to elasticity |
| 2 | • Available memory: 10GB<br>• On-hold jobs: A: 250GB<br>• New jobs:<br>• Expected extra memory: 2 * 100GB | • C used the 90GB |
| 3 | • Available memory: 210GB<br>• On-hold jobs: A: 250GB<br>• New jobs: D: 200GB<br>• Expected extra memory: 1 * 100GB | • The 2x 100GB machines joined, but job A can still not start |
| 4 | • Available memory: 10GB<br>• On-hold jobs: A: 250GB<br>• New jobs:<br>• Expected extra memory: 1 * 100GB | • D used the 200GB |
| 5 | • Available memory: 110GB<br>• On-hold jobs: A: 250GB<br>• New jobs:<br>• Expected extra memory: 0GB | • The 1x 100GB machine joined<br>• The system reached the maximum memory consumption and cannot add more machines<br>• Job A starved |

MEMORY-TRACKING RESOURCE MANAGER FOR ELASTIC DISTRIBUTED GRAPH-PROCESSING SYSTEM

FIELD OF THE INVENTION

The present invention relates to memory tracking for an elastic distributed graph-processing system.

BACKGROUND

A graph database is a database that uses graph structures for semantic queries with nodes, edges, and properties to represent and store data. A graph relates data items in the store to a collection of nodes and edges, the edges representing the relationships between the nodes. The relationships allow data in the store to be linked together directly and, in many cases, retrieved with one operation. Graph databases hold the relationships between data as a priority. The underlying storage mechanism of graph databases can vary. Relationships are a first-class citizen in a graph database and can be labeled, directed, or given properties. Some implementations use a relational engine and store the graph data in a table.

Many applications of graph database processing involve processing increasingly large graphs that do not fit in a single machine's memory. Distributed graph processing engines partition the graph among multiple machines and execute graph processing operations in the multiple machines, potentially in parallel, with communication of intermediate results between machines. Distributed graph processing engines can be implemented in cloud environments to provide dynamic scalability as graph sizes increase.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 1 illustrates example results for pattern matching, GROUP BY, and ORDER BY for an example query on a graph distributed across two machines in accordance with an illustrative embodiment.

FIG. 5 illustrates memory reservation for jobs put on hold from implicit reservations and restarted without an exponential factor and with an exponential factor in accordance with an illustrative embodiment.

FIG. 6 illustrates a resource-manager policy that allows all incoming jobs to be submitted resulting in live-locks.

DETAILED DESCRIPTION

Figure 2:
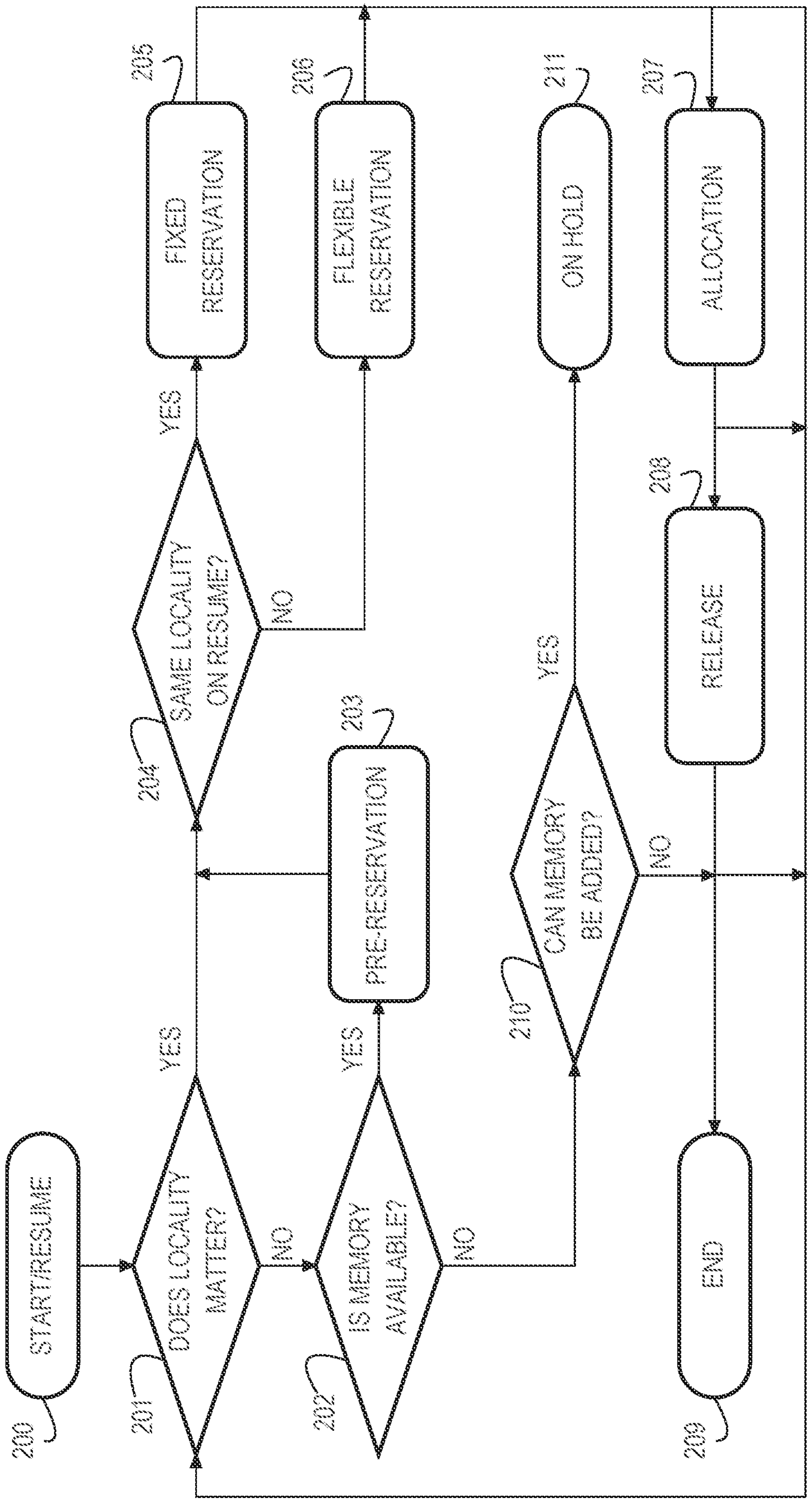
FIG. 2 is a flowchart illustrating memory reservation lifecycle in accordance with an illustrative embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In a distributed graph processing system, graph data is partitioned and loaded into the main memory of multiple machines in a distributed manner. Various user operations, such as graph queries or graph algorithms, can then be efficiently executed over this data. The illustrative embodiments introduce a resource manager design for an elastic/scale-out multi-user distributed graph processing system, where several users simultaneously execute operations while the system automatically scales out when under memory pressure. The resource manager is responsible for the centralized tracking of memory utilization across those machines. Graph data can be inherently skewed (e.g., social network graphs that follow a power-law degree distribution), and graph operations can produce skewed amounts of output data, even under uniform graph data partitioning. The illustrative embodiments provide a resource manager design that builds on memory pre-reservations and reservations to capture this complex nature of graph operations. Graph operations reserve memory-sometimes based on a heuristic estimation of their memory requirement-while allocating memory solely from their reservation. Memory reservations are characterized as fixed or flexible, such that operations that rely on the graph data distribution over machines can accurately express their requirements in the face of elasticity. Altogether, the resource manager in the illustrative embodiments can bind with any external interface, such as the control plane of a cloud environment, to allow for elasticity (adding machines to or removing machines from the cluster). The resource manager of the illustrative embodiments guarantees that all operations will eventually complete if there is enough memory for each individual operation and can leverage evictions of data from memory, as well as graph rebalancing to make enough memory available for ongoing operations to execute.

The illustrative embodiments introduce a resource manager component for distributed graph processing that supports elasticity with the diverse set of graph operations using a reservation-first approach. For operations such as loading a graph, flexible reservations give the resource manager the flexibility to use all available memory of the distributed system. Therefore, the partitioned graph data can be assigned to machines in a manner that allows for the highest degree of parallelism and for the best performance. However, graph operations, such as graph pattern matching, can nevertheless produce skewed amounts of output data that cannot be predicted beforehand, even when the graph data has been uniformly distributed. Fixed reservations inform the resource manager that a given operation will invariantly require a certain amount of memory on a specific machine, as dictated by the graph's characteristics and partitioning. Additionally, pre-reservations provide a fail-fast mechanism of identifying whether an operation can start/resume, whether it must remain on hold, or whether it must be cancelled if its requirements are deemed impossible to satisfy. Reservations also allow the resource manager to avoid live-locks in the presence of concurrency in a simple yet effective way.

The resource manager of the illustrative embodiments uses very few and simple concepts (i.e., pre-reservations, flexible reservations, fixed reservations), yet the resource manager can express the very diverse set of operations available in distributed graph processing. Additionally, the resource manager makes granular-only coordination for reservations; therefore, most allocations are local and with no overhead. Finally, the resource manager uses very simple policies to avoid live-locks.

Adversarial (or unlucky) execution schedules might create jobs that over-request resources (e.g., a job asks for 8 GB and is put on hold and the resource manager resumes the job with 16 GB when the job could actually need 8.1 GB). Additionally, the system can theoretically become stuck in a pessimistic execution mode due to consecutive on-hold operations. Nevertheless, in practice, these sub-optimal schedules should rarely occur, and employing mechanisms, such as heuristically limiting the number of times a job can be put on hold, can help mitigate these issues.

Memory-Tracking Resource Manager for Elastic Distributed Graph Processing System Graph processing is a challenging workload for database management systems (DBMSs), exposing a number of key user operations on graph data, such as graph algorithms (e.g., PageRank) and graph queries. For example, the operation, "find the friends of my friends with whom I have the most common friends," can be expressed as a graph query in Query 1, in Property Graph Query Language (PGQL), as follows:

Query 1: "Friends of my friends with whom I have the most common friends"

```
SELECT p1, p3, COUNT(*) as num_common_friends
FROM MATCH (p1:person)-[:friend]->(p2:person)-[:friend]->(p3:person)
WHERE p1 != p3
AND NOT EXISTS ( SELECT * FROM MATCH (p1)-[:friend]->(p3:person) )
GROUP BY p1, p3
ORDER BY num_common_friends DESC
```

On one hand, graph algorithms typically iterate repeatedly over the graphs and often some data structure abstractions, such as hash maps and priority queues inherently in their implementations. On the other hand, graph queries match patterns on the graph and, further, as seen in the above example, perform traditional relational operations, such as GROUP BY and ORDER BY. A "complete" graph processing system includes various data structures: graph, graph delta (a new snapshot of the graph after some updates, such as vertex insertions, are performed), hash maps, priority queues, tables/frames (a tabular relational structure that holds the results of the query patterns and enables relational processing, such as GROUP BY).

In a distributed graph processing system, all these data structures are partitioned across the machines of the cluster. In an embodiment, the DBMS comprises a resource manager, which handles database processes for the database system. The resource manager may be a background daemon, a database component, software module, or some combination thereof. The resource manager may monitor database instance(s) and track processor and I/O resources across database processes. In an embodiment, the resource manager is a process scheduler that interrupts, de-schedules, schedules, or otherwise controls when database processes may run. In an elastic distributed graph system, i.e., a system where more machines can be added on-demand to increase the total memory and compute capacity, or respectively machines can be removed, the resource manager component tracks and enforces how memory is used within and across machines. Memory is tracked across the various jobs that implement user commands, and across in-memory objects, such as loaded graphs. Typically, these systems also provide multi-user support, resulting in many parallel jobs executing at the same time, contending for resources. Altogether, for a multi-user elastic graph processing system (i.e., the core of any graph service in the Cloud) to operate properly, such a resource manager in an embodiment does:

(1) Communicate memory requirements with a control plane that adds or removes machines to/from the cluster.

(2) Track and enforce how memory is used within and across machines and across the various parallel jobs.

(3) Ensure that no job gets stuck (is never executed) because of other jobs and their requirements.

(4) Keep the max memory consumption of the system contained.

(5) Enforce any configured user memory limits set by the cloud service operator.

(6) Most importantly, uniformly express the diverse characteristics of the above-mentioned data structures and graph/relational operations.

To highlight, the complexity of requirement (6) above further, consider loading a graph G from files to distributed memory and executing on G a Query 2, which is similar to Query 1 above, as follows:

Query 2: Variation of Query 1 with country filter

```
SELECT p1, p3, COUNT(*) as num_common_friends
FROM MATCH (p1:person)-[:friend]->(p2:person)-[:friend]->(p3:person)
WHERE p1 != p3
AND NOT EXISTS ( SELECT * FROM MATCH (p1)-[:friend]->(p3:person) )
AND p1.country = "Italy" AND P3.country = "France"
```

-continued

| Query 2: Variation of Query 1 with country filter |
| --- |
| GROUP BY p1, p3<br>ORDER BY num_common_friends DESC |

Loading the graph in memory can use accurate heuristic techniques (such as data sampling) to estimate the size of the graph in advance before the actual loading to memory. Given the estimation, the resource manager has the freedom to decide how the memory should be reserved and allocated on the machines of the distributed system to better serve the needs, balance, and/or performance of the system—i.e., graph loading is rather flexible in terms of memory placement.

However, the graph query executes on top of the already placed graph; hence, the produced intermediate and final results are deterministically placed based on the graph partitioning and placement (e.g., the results of this query will be stored on the machines that hold the last matched element—the 'p3' vertices). In addition, it is practically impossible to have an accurate prediction of how much memory the query will consume before execution. In this example, the placement of persons with 'p1.country="Italy" AND p3.country="France"' will dictate where the data will go. However, even if these persons are all placed on a single machine out of a 16-machine cluster, for example, the resource manager could decide to execute GROUP BY on all 16 machines if the single machine is under memory pressure. The GROUP BY operation typically relies on hash functions to place data on machines; therefore, almost any implementation can support this (or the tabular data could be reshuffled before executing GROUP BY in an alternative implementation).

For any part of a query's execution (matching, ordering, grouping), the system may run out of memory. Therefore, the resource manager tracks and properly "negotiates" with the control plane of the cluster if memory can be added to the system and how much, in the form of additional machines.

Reservation-Driven Memory Tracking Model with Centralized Memory Utilization Tracking The illustrative embodiments introduce a resource manager design for distributed graphs that relies on a reservation-driven memory tracking model. This model enables the resource manager to have centralized, global, accurate, and up-to-date memory usage information. It also keeps a low overhead for tracking individual allocations and checking them against user-defined resource limits. In the rest of this disclosure, any user command, such as a graph query, is executed by a job in the distributed graph engine. Jobs request memory from the resource manager. In one embodiment, key aspects of the design are as follows:

- All memory allocations happen from memory that has been first reserved. Jobs can reserve memory based on their expected requirements. If insufficient memory is available at allocation time, a request to extend the memory reservation of the job is filed with the resource manager.
- Reservations happen with mid-sized granularity. In a distributed system, there is typically no need to handle memory at byte-granularity. Reservations have a minimum size dependent on the machine size—e.g., on a server with 128 GB memory, any configurable size of 128 up to 256 MB will keep the overhead low and the accuracy fine enough.
- Memory tracking is done in a transaction-like manner for each job. For efficiency, the resource manager only tracks reserved memory on a global level during the execution of a job. At the end of a job's execution, it "commits" the amount of memory that outlives it (i.e., which persistent objects, such as graphs, it created/modified/destroyed) and releases its reserved memory.
- Jobs that are waiting for memory are treated on a first-come-first-served basis and take priority over incoming jobs. This ensures that there are no live-locks, and that all jobs make fast progress.

In one embodiment, memory reservations are tracked for each job running in the cluster as follows:

- The resource manager keeps track of all memory reservations at a global level (i.e., aggregated information across machines). The resource manager always has an accurate view of all memory reservations.
- The resource manager does not keep track of all memory allocations on a global level. Allocating memory is done without involving the resource manager, provided enough memory has been reserved beforehand.
- The resource manager keeps track of all persistent memory objects at a global level. The resource manager always has an accurate view of where and how much memory is consumed by objects such as graph data.

In various embodiments, the resource manager can be implemented either as a centralized or a decentralized component. In the centralized implementation, a leader machine receives and processes all reservation requests from jobs executing in the cluster. In the decentralized implementation, every machine implements the resource manager logic. In one embodiment, the resource manager comprises a plurality of resource manager instances running on respective machines in the cluster, and each resource manager instance propagates changes to the amount of available cluster memory and the amount of available machine memory in each machine in the cluster to other resource manager instances using a replication protocol. An example of the replication protocol is a consensus protocol, such as Raft, which handles agreement. In one alternative embodiment, the resource manager core can be built as a completely external component to the graph runtime system, communicating e.g., with REST application programming interfaces (APIs).

If the resource manager detects that a job cannot be executed due to lack of memory, it puts the job on hold and will take one or more out of several potential actions (described later and dependent on the specific graph system) to find memory and try to resume this job. Putting the job on hold and resuming it later can be implemented in two main ways:

1. Cancelling the job and restarting it later from scratch; or
2. Saving the intermediate state to external storage (to release memory) and resuming the job later by first bringing the intermediate state back to memory. For these to be feasible, jobs in the graph engine should support pausing and resuming from intermediate state.

The resource manager of the illustrative embodiments works with both approaches. When a job is put on hold, all the job's reservations are released to allow for other useful work to proceed, but the resource manager keeps track of how much memory was used for when the on-hold job is continued.

Different graph operations can have very different memory usage characteristics. For graph loading, allocations include intermediate data structures while loading and final graph structure once completed, memory placement includes fully flexible graph vertices, edges, and properties, and the memory can be quite accurately estimated before execution. For a graph operation that filters vertices to get a vertex set on top of the graph, allocations include a set containing the vertex identifiers (IDs) to be included in the set (maximum size=number of vertices), memory placement must follow the exact same partitioning as the underlying graph, and maximum memory can be estimated before execution. For the PageRank graph algorithm, allocations include a graph property array (of numerical type double) that will hold the PageRank output value per index (most implementations also include a second, temporary array (also of type double)), memory placement must follow the exact same partitioning as the underlying graph, and required memory is known before execution. For a query with GROUP BY, allocations are implementation dependent, but in principle include memory for holding intermediate results of pattern matching, memory for hashmaps for GROUP BY, and final memory produced. Pattern matching produces results based on the graph partitioning, the pattern, and the filters. Memory placement for GROUP BY is typically quite flexible. A query with GROUP BY is not estimation friendly for the pattern matching part; however, for GROUP BY, memory is capped by the size of the intermediate results.

Fulfilling these requirements becomes even more complex if the resource manager accounts for the out-of-memory and job-placed-on-hold situations that these jobs must support. To capture these requirements in an intuitive way, the illustrative embodiments introduce three types of reservations as follows:

Pre-Reservation:

A job X requires some amount Y of memory. Machine locality is not required. It is guaranteed that the cluster currently holds at least Y memory. Y memory is required anywhere in the cluster. Pre-reserved memory will subsequently be bound to one or more machines before the job can allocate memory from the pre-reserved memory.

Flexible Reservation:

A job X requires some amount Y of memory on machine Z. Machine locality is required. Machine locality may change upon on-hold/restart. It is guaranteed that the cluster currently holds at least Y memory. It is guaranteed that at least Y memory resides on machine Z. There is no guarantee where the memory resides if the job is restarted. Y memory is required on machine Z, but upon the job being on hold, this requirement can be moved.

Fixed Reservation:

A job X requires some amount Y of memory on machine Z. Machine locality is required and must stay the same upon on-hold/restart. It is guaranteed that the cluster currently holds at least Y memory. It is guaranteed that at least Y memory resides on machine Z. It is guaranteed that once the job is restarted, Y memory resides on machine Z. Y memory is required on machine Z for this job to succeed.

As an example, consider a graph query that does pattern matching GROUP BY and ORDER BY, Query 3 above, as follows:

Query 3: Number of friends per person from max to min

```
SELECT person, COUNT(*) AS friends
MATCH (person:person)-[:friend]->(:person)    -- 1. pattern matching
GROUP BY person                               -- 2. GROUP BY
ORDER BY friends DESC                         -- 3. ORDER BY
```

Query 3 would perform the following reservations (for a simplified view of a specific implementation):

1. Pattern matching: fixed reservations for all intermediate and all final results. These strictly depend on the graph partitioning.
2. GROUP BY: flexible reservations to put in a map for implementing GROUP BY. The implementation can use different hash functions as needed.
3. ORDER BY: flexible reservations to put the final result table, deciding the range of values that each machine will be holding.

FIG. 1 illustrates example results for pattern matching, GROUP BY, and ORDER BY for an example query on a graph distributed across two machines in accordance with an illustrative embodiment. As seen in the depicted example, Machine 0 has three matches for person0, one match for person1, two matches for person2, one match for person 3, and two matches for person4, while Machine 1 has three matches for person101. The reservations for these results depend on the graph partitioning. Before execution, the maximum memory can be estimated before execution; however, the actual memory required will be determined as the query progresses, and the job executing Query 3 can incrementally reserve more and more memory. After execution, it turns out that there are many more results on Machine 0 than Machine 1. Thus, if Machine 0 runs out of memory, the job executing Query 3 would reserve more memory for Machine 0 before proceeding with the pattern matching phase. On the other hand, the reservations for GROUP BY and ORDER BY are flexible, and the amount of memory required can be estimated using heuristics or histograms of data patterns, for example.

Job Lifecycle Under Memory Pressure

When a job tries to reserve more memory than is currently available in the cluster, the job can either be put on hold or be cancelled. Putting a job on hold happens when the resource manager expects that memory might become available (e.g., more machines might join the cluster, some other jobs running will finish and release memory, etc.). All the current reservations of the job are released, all the objects it has created are destroyed, and the job is queued waiting for memory to become available. As mentioned earlier, in alternative implementations, jobs can release their allocations but save their intermediate state to restore later when resumed. The job will be restarted once its reservation requirements are satisfied. Nevertheless, the graph processing system can easily hide this on-hold action from the user such that the user only observes the final result of the command/job being later successfully completed.

Cancelling a job happens when the resource manager hits the maximum amount of memory that can ever be attained by the system (i.e., the control plane informs the system that no more machines can join). All the currently reserved memory of the job is released, all the objects it has created are destroyed, and the job is not requeued. In this case, the user receives an actual out-of-memory error message.

Memory Reservation Lifecycle

A job can reserve memory in any of the three methods described above, multiple times during its execution, depending on requirements. A job cannot unreserve memory explicitly. This is to guarantee that the job always makes progress. A job can ask the resource manager to reduce a reservation by trimming the reservation, but this is not guaranteed. The behavior is similar to asking a Java™ runtime to invoke the garbage collector. A job will convert any pre-reserved memory into either a flexible or fixed reservation before performing any allocations from the reservation. This can be done explicitly, by specifying which machine the memory must reside on, or implicitly, by asking the resource manager to distribute the memory as best as it can.

FIG. 2 is a flowchart illustrating memory reservation lifecycle in accordance with an illustrative embodiment. Operation begins when the job starts or resumes (block 200). The job determines whether locality matters for the memory being reserved (block 201). For example, the job may be performing a graph loading operation, and the job may decide later how to distribute the graph data components among the machines. In this case, the job may determine that locality does not matter at this time for the memory being reserved for the graph loading operation, just that the cluster must have a certain amount of memory available to load the graph. If the job determines that locality does not matter (block 201: NO), then the job determines whether the required amount of data is available in the cluster (block 202). If the required amount of data is available (block 202: YES), then the job makes a pre-reservation request (block 203).

Because a job will subsequently convert any pre-reserved memory into either a flexible or fixed reservation before performing any allocations from the reservation, operation then proceeds to block 204 to determine whether the same locality is required on resume if the job is put on hold. Similarly, if the job determines that locality does matter (block 201: YES), then the job determines whether the same locality is required on resume (block 204). If the same locality is required on resume (block 204: YES), then the job makes a fixed reservation request (block 205). The fixed reservation request guarantees that the required amount of memory is available on a specified machine and that the required amount of memory will reside on the specified machine if the job is restarted. If the same locality is not required on resume (block 204: NO), then the job makes a flexible reservation (block 206). The flexible reservation request guarantees that the required amount of memory is available on a specified machine but does not guarantee that the required amount of memory will reside on the specified machine if the job is restarted.

During execution of a graph processing operation, such as a query, the job may determine that more memory is required. Thus, after making the fixed reservation in block 205 or the flexible reservation in block 206, operation may proceed to block 201 for the next memory reservation.

In blocks 203, 205, and 206, the amount of memory is reserved with the resource manager, which performs centralized tracking of memory utilization across those machines; however, reserving memory does not allocate memory to the machines. Therefore, after making the fixed reservation in block 205 or making the flexible reservation in block 206, the job performs an allocation to allocate the required amount of memory to the specified machine (block 207). Operation may then proceed to block 201 for the next memory reservation.

When the job completes execution of the graph processing operation, then the job releases reserved memory (block 208), and operation ends (block 209).

If the job determines that memory is not available (block 202: NO), then the job determines whether memory can be added (block 210). The job may determine whether memory can be added based on whether the resource manager returns an out-of-memory error, for example. If the job determines that memory can be added, then the job is put on hold (block 211). The job may be restarted from the on-hold state. When a job is put on hold, all the job's reservations are released to allow for other useful work to proceed, but the resource manager keeps track of how much memory was used for when the on-hold job is continued. If memory cannot be added (block 210: NO), then operation ends (block 209).

Resource Manager Communication

Figure 3:
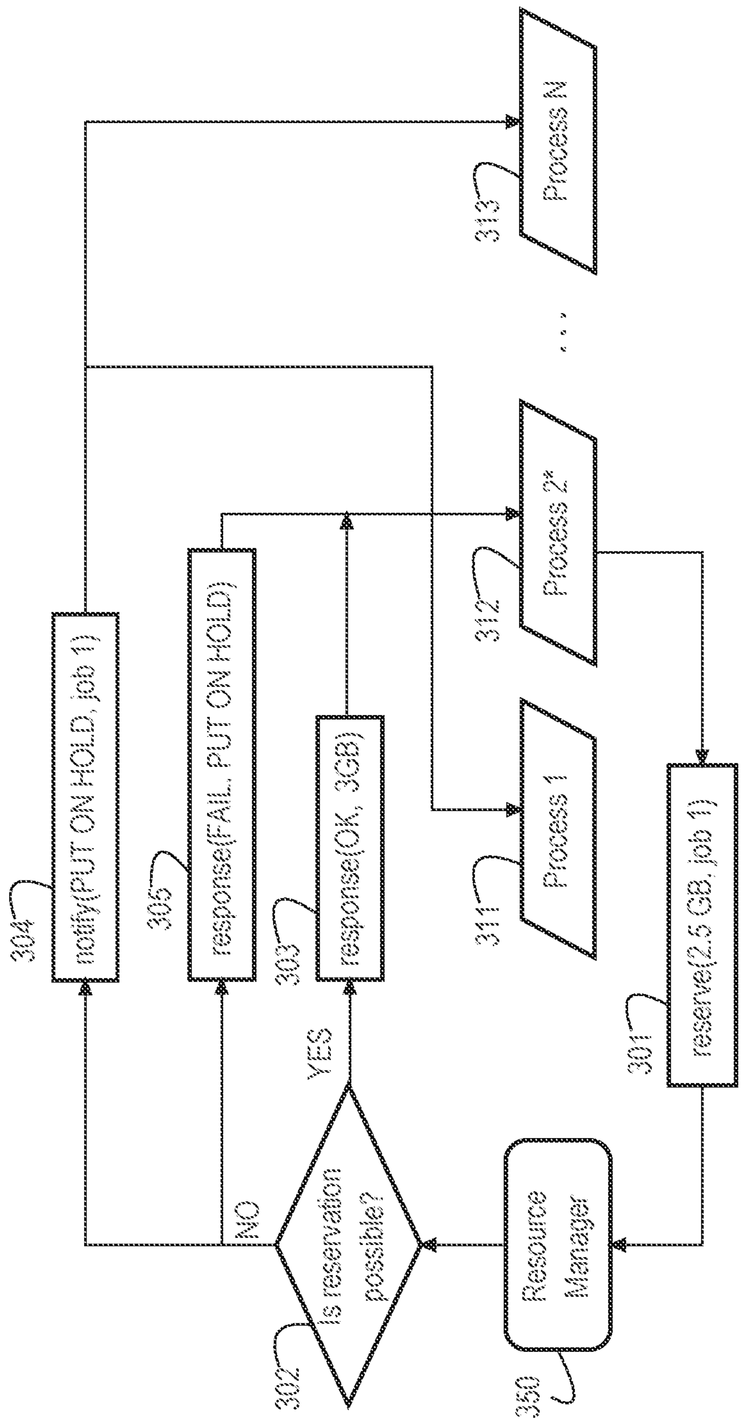
FIG. 3 is a flowchart illustrating job lifecycle in an elastic distributed graph processing system with a memory tracking resource manager in accordance with an illustrative embodiment.

To reserve memory, a job submits a reservation request to the resource manager. The request contains information about the required amount of memory, the type of reservation, and the job that is making the reservation. The resource manager evaluates the feasibility of the request and sends a response to confirm or deny the request. If the request is denied, then the job cannot continue and is put on hold. Although the resource manager knows that Y amount of memory is required on machine Z, when a job is put on hold, the requirement may become stale. FIG. 3 is a flowchart illustrating job lifecycle in an elastic distributed graph processing system with a memory tracking resource manager in accordance with an illustrative embodiment. Job 1 performs a graph processing operation on the distributed graph processing system, which executes a plurality of processes (process 1 311, process 2 312, . . . , process N 313), each executing on a different machine of a cluster of machines. Operation begins with process 2 312 attempting to reserve memory for job 1 by making a reservation request for 2.5 GB (block 301) to resource manager 350.

A job might not accurately know its memory requirements. Therefore, in some embodiments, the job might try to allocate more memory than it has reserved (or might not reserve memory explicitly at all). In some embodiments, any allocation greater than the existing memory reservation will implicitly attempt to increase the existing reservation. This may be transparent to the rest of the job implementation.

The resource manager 350 determines whether the reservation is possible (block 302). If the reservation is possible (block 302: YES), then the resource manager returns a response to process 2 indicating that a reservation of 3 GB is successful (block 303). In some embodiments, memory reservations are created and increased in mid/coarse increments to reduce the number of requests sent to the resource manager. This parameter is configurable and transparent to the implementation of any job. As mentioned above, in any cluster with server machines with more than 128 GB of memory, the reservation granularity could be set between 128 MB and 512 MB of memory. When a job submits a reservation request, it specifies the minimum amount of memory required (2.5 GB in the example of FIG. 3), but the resource manager may grant more memory to comply with the configured reservation increment (3 GB in the example of FIG. 3). The resource manager responses with the new size of the job's reservation. For example, if a job requests 200 MB but the reservation increment is 512 MB, then it will either receive a reservation increase of 512 MB or will be put on hold until at least 512 MB of memory is available.

If the reservation is not possible (block 302: NO), then the resource manager notifies the other processes (process 1 311, . . . , process N 313) that job 1 is put on hold (block 304) and returns a response to process 2 indicating that the reservation fails and that job 1 is put on hold (block 305). Operation repeats for each process attempting to reserve memory until the job is put on hold or the job completes the graph processing operation.

When a job is put on hold and resumed, its existing reservations are converted in the following manner: a pre-reservation is maintained across restarts; flexible reservations are converted to pre-reservations on restart; and fixed reservations are maintained on restart. In some embodiments, the resource manager supports setting limits on memory consumption. The limits are enforced in the following manner:

1. Each job can be held accountable to multiple user limits (e.g., TOTAL system, USER "Dave," ROLE "analyst")
2. Limit checking is done when a reservation request is submitted to the resource manager.
3. If the new reservation exceeds at least one of the existing limits, the job is cancelled, and an error message is returned to the user.

Resource Manager Interactions with Jobs

Tracking Persistent Object Memory Consumption

There are certain memory objects that outlive the jobs that create them, such as graphs, tables/frames, query result sets, algorithm output, etc. The most prominent example is loading a graph from files or from a relational database, which translates to a job that creates the graph data structure and, upon completion, makes the graph available to the user for processing. The resource manager tracks these objects in order to accurately reflect the available memory in the cluster. The resource manager does this in the following manner:

1. During job execution, all objects are allocated from previously reserved memory. Since the resource manager is already aware of the reserved memory, it does not need to be notified separately for each object.
2. At the end of a successful job's execution, the job notifies the resource manager of all objects that it has created and that will persist beyond the end of its execution, or of any previously existing objects (not created by this job) that it has modified or destroyed. If the job's execution ends in failure, ends by cancellation, or is put on hold, the job does not inform the resource manager about any objects, because they will not be persisted (they are all destroyed as part of the job cleanup).
3. The resource manager updates its internal tracking of persistent object memory, and releases any reserved memory not used by the persistent objects.

Figure 4:
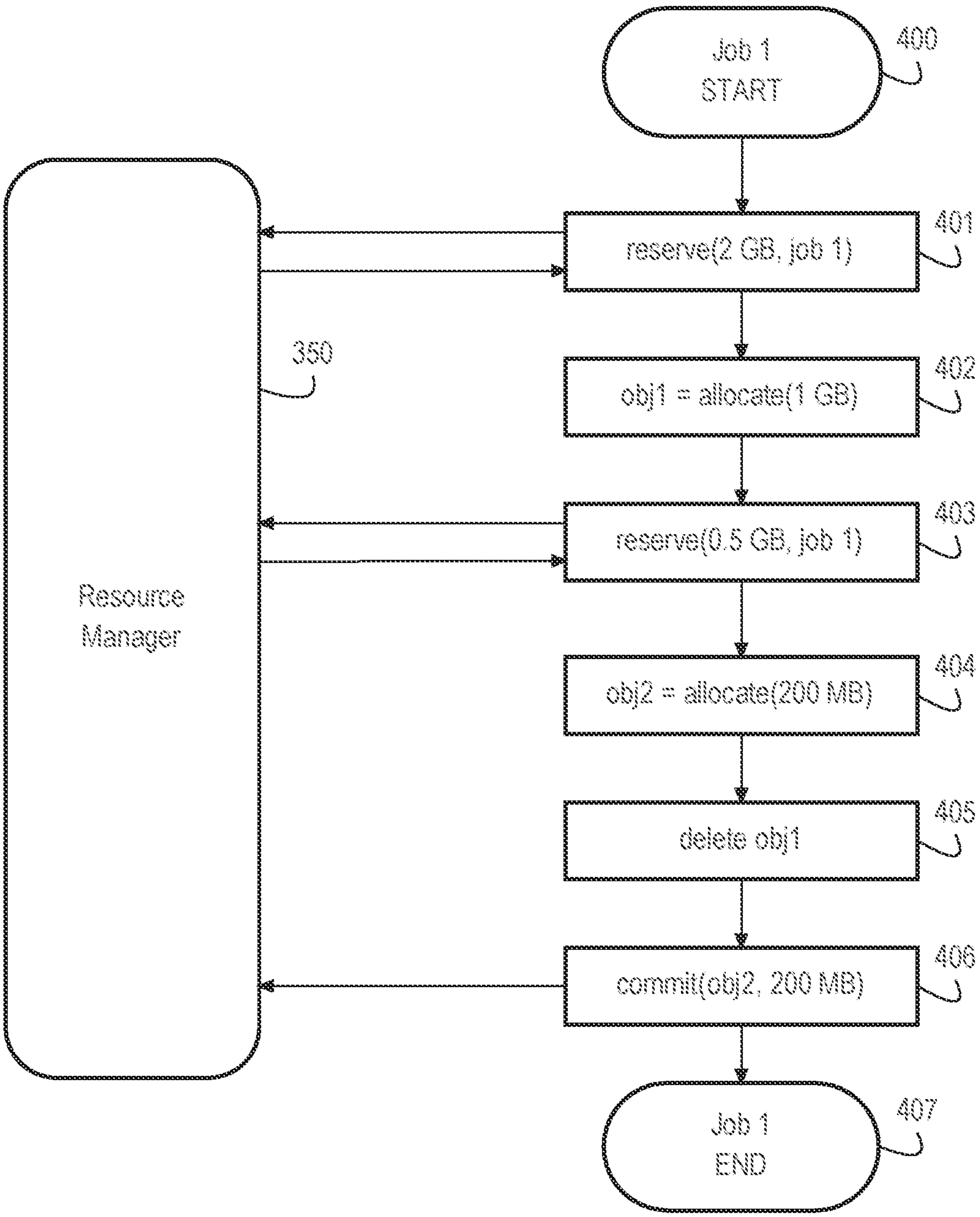
FIG. 4 is a block diagram illustrating a job interacting with the resource manager and committing objects in accordance with an illustrative embodiment.

In that sense, the job is like a transaction: any object created from reserved memory may be either destroyed or committed to the resource manager at the end of its execution. FIG. 4 is a block diagram illustrating a job interacting with the resource manager and committing objects in accordance with an illustrative embodiment. Operation begins with job 1 starting (block 400). Job 1 sends a reservation request to resource manager 350 to request reservation for 2 GB of memory, and the resource manager 350 sends a response back to job 1 granting the reservation (block 401). Job 1 then allocates 1 GB of memory for a data object (obj1) (block 402).

Thereafter, job 1 sends a reservation request to resource manager 350 to request reservation for 0.5 GB of memory, and the resource manager 350 sends a response back to job 1 granting the reservation (block 403). Job 1 then allocates 200 MB of memory for a data object (obj2) (block 404). Job 1 then deletes obj1 (block 405) and commits obj2 to persistent object memory (block 406). Resource manager 350 tracks 200 MB of persistent object memory for obj2. Thus, even after job 1 ends (block 407), the resource manager 350 ensures that the 200 MB for obj2 remains unavailable for subsequent reservations.

In accordance with the illustrative embodiment, the system adheres to the following:

available_cluster_memory=physical_cluster_memory−reserved_cluster_memmory−persistent_object_memory available_machine_memory[machine X]=physical_memory[machine X]−reserved_memory[machine X]−persistent_object_memory[machine X]

Ensuring Jobs Make Fast Progress

When a job tries to implicitly increase its reservation (i.e., tries to allocate more memory than it had reserved), it is possible that it is put on hold. If the allocations are small, and there is memory contention, then simply using the existing reservation as a pre-requirement for restarting the job can lead to premature wakeups. For example, a job tries to execute a sequence of 100 allocations, each allocating 500 MB. If the reservation granularity is 1 GB, then, in the extreme case when all reservations fail, the job could be put on hold and resumed up to 50 times. Thus, in accordance with one embodiment, the resource manager increases the reservation requirements for jobs put on hold from implicit reservations using a configurable function. For instance, a simple exponential factor can be configured, with an implicit value of 2×. This behavior is similar to dynamically-sizing containers in most modern programming languages which use this technique to reduce the number of reallocations.

FIG. 5 illustrates memory reservation for jobs put on hold from implicit reservations and restarted without an exponential factor and with an exponential factor in accordance with an illustrative embodiment. In the example shown in FIG. 5, as in the example above, the reservation granularity is 1 GB, and the job tries to execute a sequence of 100 allocations of 500 MB for a total of 50 GB. Because there is memory contention, each time the job attempts to allocate memory beyond its reserved memory amount, it is put on hold and subsequently restarted.

As shown in the depicted example, upon restart and reservation number 1, the reservation increment without the factor is 1 GB and, thus, the amount of memory reserved is 1 GB; however, with the 2× factor, the reservation increment is 2 GB, and the amount of memory reserved is 2 GB. After restart number 2, the amount of memory reserved without the factor is 2 GB, and the amount of memory reserved with the factor is 4 GB. This continues until restart number 6, at which point the amount of memory reserved without the factor is 6 GB, and the amount of memory reserved with the 2× factor is 64 GB. Thus, the required amount of 50 GB is achieved after 6 restarts using the 2× factor, while 50 restarts are required to achieve the required amount of 50 GB without the 2× factor.

The scenario exemplified in FIG. 5 is intentionally selected as an extreme example of memory contention, where each reservation incrementation request fails. In practice, the purpose of this approach is to quickly reach the amount of memory required by the job to run to completion when there is no existing estimate information. Typically, larger reservations will be more difficult to fulfill when multiple jobs are running, but the fact that new jobs can be rejected from starting if there is some job waiting for memory (as described below with reference to FIG. 6), guarantees that any job put on hold should not need to wait longer than the amount of time needed for a new machine to join or for the existing jobs to release enough memory, as the case may be.

As shown in FIG. 5, the worst-case number of times the job can be put on hold may be reduced from 50 for the reservation increment without the 2× factor to 7 for the reservation increment with the 2× factor. This factor-based increment can be combined with the reservation trimming requests described above to reduce the possibly excessive memory reservations.

In some embodiments, the resource manager uses the configurable function to increase the reservation requirements in response to detecting a job that is put on hold and restarted due to implicit reservations and memory contention.

Preventing Live-Locks when Jobs are Put on Hold

In many systems, user commands are executed with some form of first-come-first served policy. Some systems further offer command/job priorities, which allow high-priority jobs to bypass lower priority jobs when the system is overloaded. Additionally, not all commands are typically submitted immediately in the presence of contention, i.e., jobs are queued. One embodiment provides a simple but effective policy for avoiding live-locks where newer incoming jobs would prohibit on-hold jobs from completing. FIG. 6 illustrates a resource-manager policy that allows all incoming jobs to be submitted resulting in live-locks. At timestamp 1, the available memory is 100 GB, the on-hold jobs include job A attempting to reserve 250 GB, a new job C attempts to reserve 90 GB, and the expected extra memory is 2*100 GB (two machines expected to be added to the cluster with 100 GB each due to elasticity).

Then, at timestamp 2, the available memory is 10 GB (100 GB-90 GB for job C), the on-hold jobs still include job A attempting to reserve 250 GB, there are no new jobs, and the expected extra memory is 2*100 GB (two machines expected to be added to the cluster with 100 GB each due to elasticity). As seen in this example, job C used the 90 GB, which prevented job A from reserving the requested 250 GB, thus resulting in job A being put on hold again.

At timestamp 3, the available memory is 210 GB (10 GB+200 GB added due to elasticity), the on-hold jobs still include job A attempting to reserve 250 GB, a new job D attempts to reserve 200 GB, and the expected extra memory is 1*100 GB (one machine expected to be added to the cluster with 100 GB due to elasticity). As seen in this example, two machines are added to the cluster with 100 GB each, but job A still cannot start due to the amount of available memory being insufficient to satisfy the reservation request.

At timestamp 4, the available memory is 10 GB (210 GB-200 GB for job D), the on-hold jobs still include job A attempting to reserve 250 GB, there are no new jobs, and the expected extra memory is 1*100 GB (one machine expected to be added to the cluster with 100 GB due to elasticity). As seen in this example, job D used the 200 GB, and job A again fails to reserve the requested 250 GB, thus resulting in job A being put on hold again.

At timestamp 5, the available memory is 110 GB (10 GB+100 GB added due to elasticity), the on-hold jobs still include job A, there are no new jobs, and the expected extra memory is 0 GB. The one machine with 100 GB joined the cluster, but the system has reached the maximum memory consumption and cannot add more machines. Job A is starved of resources, even though jobs C and D were able to start and reserve memory.

In accordance with an illustrative embodiment, the system allows jobs to be submitted as long as the system would normally submit them; however, if the resource manager detects potential unfairness, it automatically reverts to a more pessimistic execution model until the affected jobs have the opportunity to complete. Thus, in one embodiment, adding new machines is correlated with jobs that cannot progress otherwise. The resource manager goes into pessimistic mode when either: the elastic machine additions complete and the "requestor" jobs still cannot execute, or the maximum possible growth of memory cannot go further after the current incoming machines are added. For instance, in the example shown in FIG. 6, the system can only add a total of 3*100 GB, meaning that if a new job consumes the current 100 GB available and the incoming 200 GB, then job A will not have an opportunity to complete.

The pessimistic mode, in its simpler form, does not allow any new jobs to execute until the on-hold jobs have had an opportunity. The pessimistic mode can be made more effective by:

1. Always allowing jobs that declare negative reservation requirements (e.g., graph deletion); and
2. Allowing jobs to execute if they "fit" with the on-hold jobs but putting them on hold the moment they request for extra memory reservations.

The above-mentioned policies can be adjusted, or different policies can be devised to serve the business requirements of the graph processing system deployment. For instance, the most pessimistic policy could switch to single command execution the moment there is a single on-hold job.

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically marked data objects; however, the hierarchically marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MongoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables, and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., workstations, personal computers) that are interconnected via a network.

Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance." A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e., .java file) and the compiled version of the class (i.e., .class file).

Native data types are data types supported by a DBMS "out-of-the-box." Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as valid data types and to be processed by a DBMS in database statements. In general, database software of a DBMS is programmed to recognize and process native data types without configuring the DBMS to do so by, for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
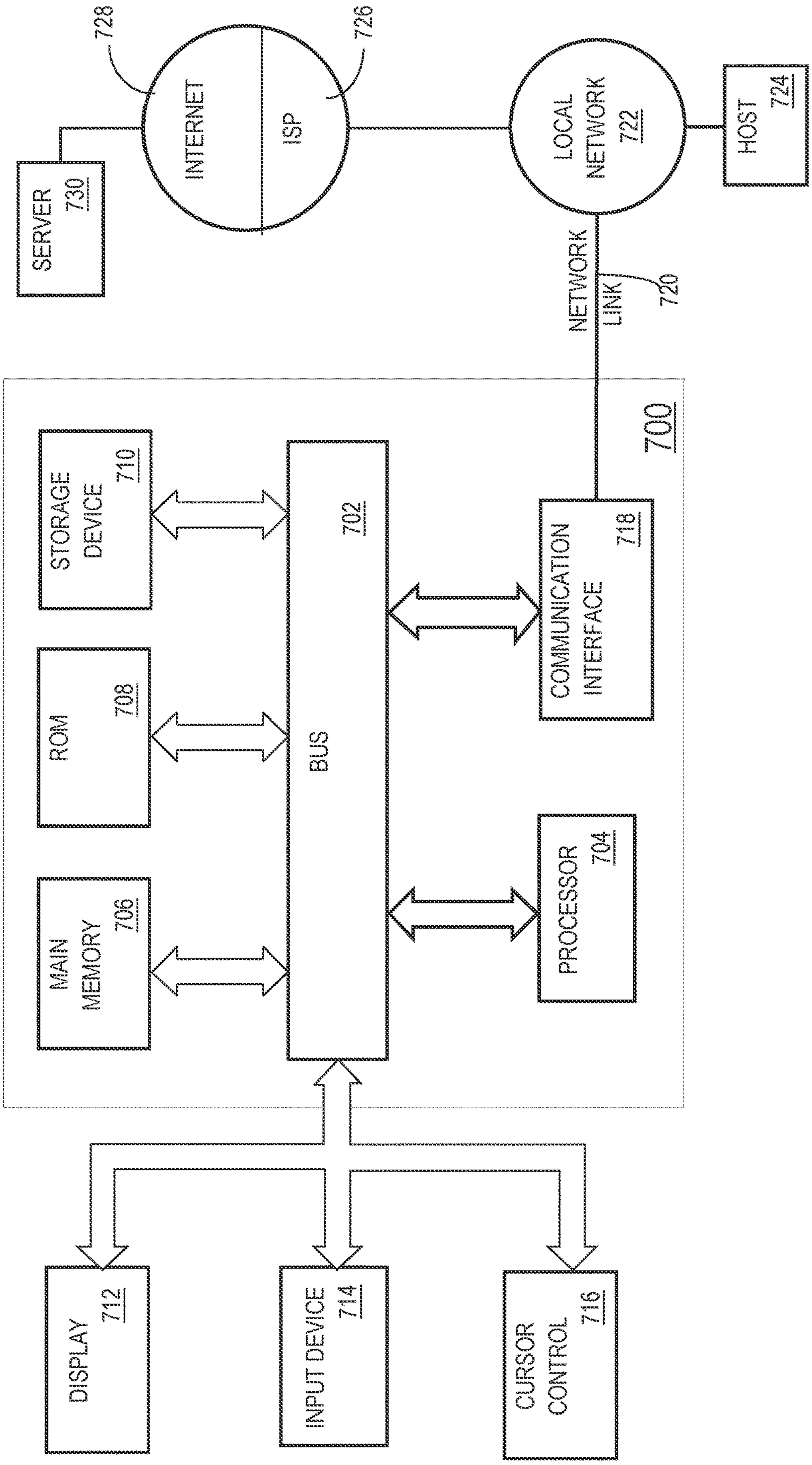
FIG. 7 is a block diagram that illustrates a computer system 700 upon which aspects of the illustrative embodiments may be implemented.

For example, FIG. 7 is a block diagram that illustrates a computer system 700 upon which aspects of the illustrative embodiments may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
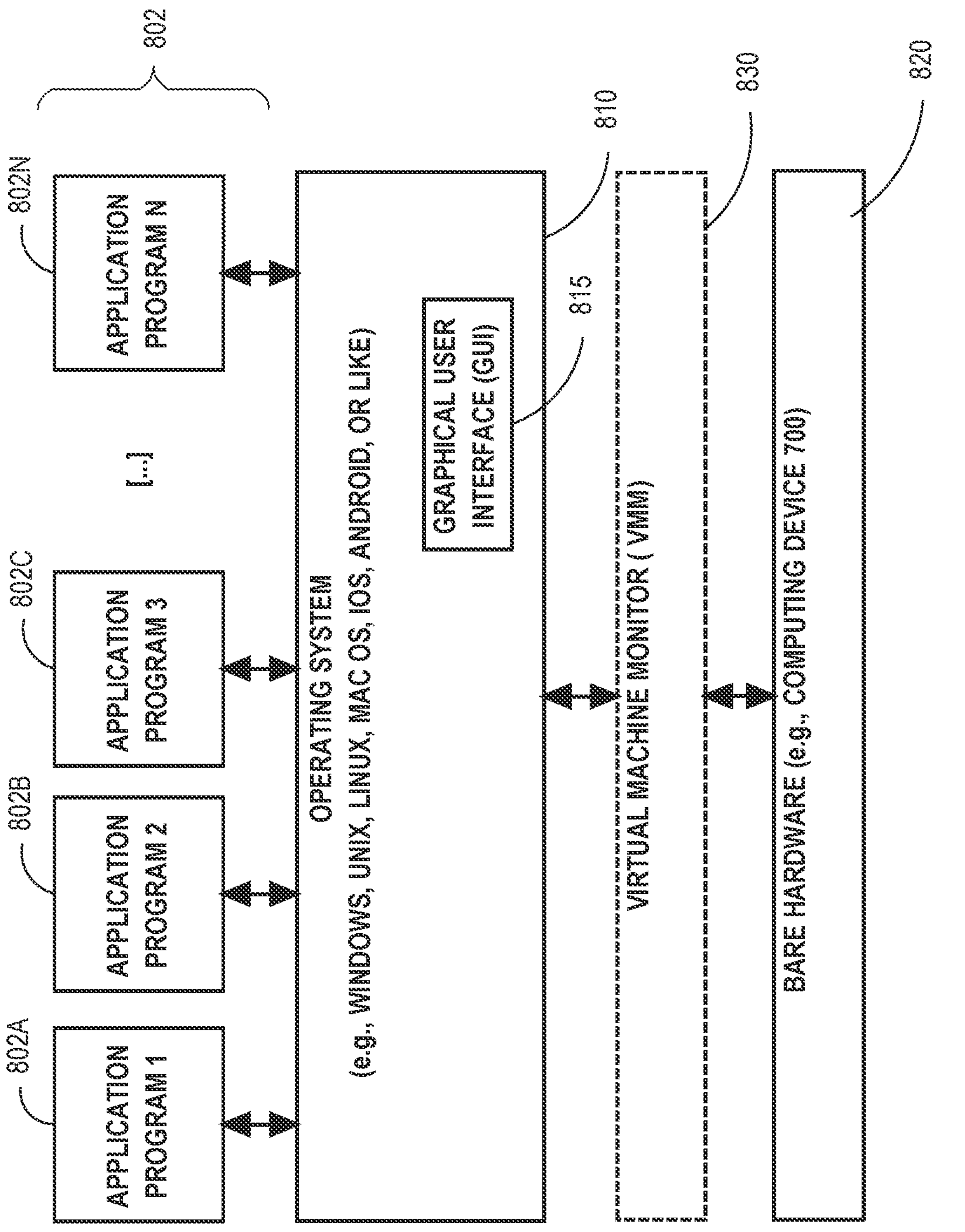
FIG. 8 is a block diagram of a basic software system that may be employed for controlling the operation of a computer system in accordance with an illustrative embodiment.

FIG. 8 is a block diagram of a basic software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:

receiving, by a resource manager, a reservation request from a job for a graph processing operation, wherein:

the resource manager tracks an amount of available cluster memory for a cluster of machines and an amount of available machine memory in each machine in the cluster, and the reservation request specifies an identification of the job, a type of reservation, and an amount of memory requested;

determining, by the resource manager, whether to grant the reservation request based on the type of reservation, the amount of memory requested, and the amount of available cluster memory or the amount of available machine memory in one or more machines in the cluster; and in response to the resource manager determining to grant the reservation request:

sending a response to the job indicating an amount of memory reserved; and adjusting the amount of available cluster memory and the amount of available machine memory for at least one machine in the cluster based on the amount of memory reserved, wherein the method is performed by one or more computing devices.

2. The method of claim 1, wherein:

the type of reservation is selected from the group consisting of a pre-reservation type, a flexible reservation type, or a fixed reservation type, the pre-reservation type requests a guarantee that the amount of memory requested is available in the cluster, the flexible reservation type requests a guarantee that the amount of memory requested is available in the cluster and a guarantee that the amount of memory requested is available in a specified machine within the cluster, the fixed reservation type requests a guarantee that the amount of memory requested is available in the cluster, a guarantee that the amount of memory requested is available in a specified machine within the cluster, and a guarantee that the amount of memory requested will reside on the specified machine if the job is restarted, and memory reserved for a reservation request of a pre-reservation type is subsequently bound to one or more machines using one or more subsequent reservation requests of flexible reservation or fixed reservation types.

3. The method of claim 1, wherein physical memory is allocated to the job without involvement of the resource manager.

4. The method of claim 1, wherein the resource manager reserves memory based on a predetermined increment to cover the amount of memory requested.

5. The method of claim 4, wherein the resource manager uses a configurable function to determine the amount of memory reserved for the reservation request in response to determining the job was previously put on hold from an implicit reservation.

6. The method of claim 5, wherein the configurable function comprises applying an exponential factor function to the predetermined increment.

7. The method of claim 1, wherein:

the job commits persistent objects in persistent object memory, adjusting the amount of available cluster memory and the amount of available machine memory comprises:

determining the amount of available cluster memory as an amount of physical cluster memory minus an amount of memory reserved for all jobs currently executing in the cluster minus an amount of persistent object memory in the cluster; and determining the amount of available machine memory for a given machine as an amount of physical machine memory for the given machine minus an amount of memory reserved for all jobs currently executing in the given machine minus an amount of persistent object memory in the given machine.

8. The method of claim 1, wherein the resource manager is a centralized resource manager servicing reservation requests from all jobs executing within the cluster.

9. The method of claim 1, wherein:

the resource manager is a decentralized resource manager comprising a plurality of resource manager instances running on respective machines in the cluster, and each resource manager instance within the plurality of resource manager instances propagates changes to the amount of available cluster memory and the amount of available machine memory in each machine in the cluster to other resource manager instances in the plurality of resource manager instances using a replication protocol.

10. The method of claim 1, wherein:

the job executes the graph processing operation in a graph runtime system, and the resource manager is external to the graph runtime system.

11. The method of claim 1, wherein:

the job comprises a plurality of processes, the resource manager receives the reservation request from a particular process within the plurality of processes, and the method further comprises:

in response to the resource manager determining to deny the reservation request, sending a response to the particular process indicating a denial of the reservation request and putting the plurality of processes on hold.

12. The method of claim 1, further comprising:

in response to the resource manager determining to deny the reservation request, sending a response to the job indicating denial of the reservation request, wherein the job is put on hold and restarts in response to receiving the response indicating denial of the reservation request.

13. The method of claim 1, further comprising:

in response to the resource manager determining to deny the reservation request, sending a response to the job indicating denial of the reservation request, wherein the job saves an intermediate state in response to receiving the response indicating denial of the reservation request and resumes execution in response to the amount of memory requested becoming available.

14. The method of claim 1, further comprising:

receiving, by the resource manager from the job, a reservation trim request to trim an amount of memory reserved for the job; and adjusting the amount of available cluster memory and the amount of available machine memory for at least one machine in the cluster based on the amount of memory specified in the reservation trim request.

15. The method of claim 1, wherein:

the job has a user-defined memory limit, and the resource manager determines to deny the reservation request in response to determining the job has exceeded its user-defined memory limit.

16. The method of claim 1, wherein the job either destroys or commits graph data objects in memory at an end of job execution.

17. The method of claim 1, further comprising:

in response to detecting an unfairness condition, automatically reverting to a pessimistic execution mode; and in response to being in the pessimistic execution mode, processing reservation requests from on-hold jobs prior to processing reservation requests from new jobs.

18. One or more non-transitory storage media storing instructions which, when executed by one or more computing devices, cause:

receiving, by a resource manager, a reservation request from a job for a graph processing operation, wherein:

the resource manager tracks an amount of available cluster memory for a cluster of machines and an amount of available machine memory in each machine in the cluster, and the reservation request specifies an identification of the job, a type of reservation, and an amount of memory requested;

determining, by the resource manager, whether to grant the reservation request based on the type of reservation, the amount of memory requested, and the amount of available cluster memory or the amount of available machine memory in one or more machines in the cluster; and in response to the resource manager determining to grant the reservation request:

sending a response to the job indicating an amount of memory reserved; and adjusting the amount of available cluster memory and the amount of available machine memory for at least one machine in the cluster based on the amount of memory reserved.

19. The one or more non-transitory storage media of claim 18, wherein:

the type of reservation is selected from the group consisting of pre-reservation, flexible reservation, or fixed reservation, the pre-reservation type requests a guarantee that the amount of memory requested is available in the cluster, the flexible reservation type requests a guarantee that the amount of memory requested is available in the cluster and a guarantee that the amount of memory requested is available in a specified machine within the cluster, the fixed reservation type requests a guarantee that the amount of memory requested is available in the cluster, a guarantee that the amount of memory requested is available in a specified machine within the cluster, and a guarantee that the amount of memory requested will reside on the specified machine if the job is restarted, and memory reserved for a reservation request of a pre-reservation type is subsequently bound to one or more machines using one or more subsequent reservation requests of flexible reservation or fixed reservation types.

20. The one or more non-transitory storage media of claim 18, wherein:

the job commits persistent objects in persistent object memory, adjusting the amount of available cluster memory and the amount of available machine memory comprises:

determining the amount of available cluster memory as an amount of physical cluster memory minus an amount of memory reserved for all jobs currently executing in the cluster minus an amount of persistent object memory in the cluster; and determining the amount of available machine memory for a given machine as an amount of physical machine memory for the given machine minus an amount of memory reserved for all jobs currently executing in the given machine minus an amount of persistent object memory in the given machine.

21. The one or more non-transitory storage media of claim 18, wherein physical memory is allocated to the job without involvement of the resource manager.

22. The one or more non-transitory storage media of claim 18, wherein the resource manager reserves memory based on a predetermined increment to cover the amount of memory requested.

23. The one or more non-transitory storage media of claim 22, wherein the resource manager uses a configurable function to determine the amount of memory reserved for the reservation request in response to determining the job was previously put on hold from an implicit reservation.

24. The one or more non-transitory storage media of claim 23, wherein the configurable function comprises applying an exponential factor function to the predetermined increment.

25. The one or more non-transitory storage media of claim 18, wherein the resource manager is a centralized resource manager servicing reservation requests from all jobs executing within the cluster.

26. The one or more non-transitory storage media of claim 18, wherein:

the resource manager is a decentralized resource manager comprising a plurality of resource manager instances running on respective machines in the cluster, and each resource manager instance within the plurality of resource manager instances propagates changes to the amount of available cluster memory and the amount of available machine memory in each machine in the cluster to other resource manager instances in the plurality of resource manager instances using a replication protocol.

27. The one or more non-transitory storage media of claim 18, wherein:

the job executes the graph processing operation in a graph runtime system, and the resource manager is external to the graph runtime system.

28. The one or more non-transitory storage media of claim 18, wherein:

the job comprises a plurality of processes, the resource manager receives the reservation request from a particular process within the plurality of processes, and the instructions, when executed by the one or more processors, further cause:

in response to the resource manager determining to deny the reservation request, sending a response to the particular process indicating a denial of the reservation request and putting the plurality of processes on hold.

29. The one or more non-transitory storage media of claim 18, wherein the instructions, when executed by the one or more processors, further cause:

in response to the resource manager determining to deny the reservation request, sending a response to the job indicating denial of the reservation request, wherein the job is put on hold and restarts in response to receiving the response indicating denial of the reservation request.

30. The one or more non-transitory storage media of claim 18, wherein the instructions, when executed by the one or more processors, further cause:

in response to the resource manager determining to deny the reservation request, sending a response to the job indicating denial of the reservation request, wherein the job saves an intermediate state in response to receiving the response indicating denial of the reservation request and resumes execution in response to the amount of memory requested becoming available.

31. The one or more non-transitory storage media of claim 18, wherein the instructions, when executed by the one or more processors, further cause:

receiving, by the resource manager from the job, a reservation trim request to trim an amount of memory reserved for the job; and adjusting the amount of available cluster memory and the amount of available machine memory for at least one machine in the cluster based on the amount of memory specified in the reservation trim request.

32. The one or more non-transitory storage media of claim 18, wherein:

the job has a user-defined memory limit, and the resource manager determines to deny the reservation request in response to determining the job has exceeded its user-defined memory limit.

33. The one or more non-transitory storage media of claim 18, wherein the job either destroys or commits graph data objects in memory at an end of job execution.

34. The one or more non-transitory storage media of claim 18, wherein the instructions, when executed by the one or more processors, further cause:

in response to detecting an unfairness condition, automatically reverting to a pessimistic execution mode; and in response to being in the pessimistic execution mode, processing reservation requests from on-hold jobs prior to processing reservation requests from new jobs.

* * * * *